US011376984B2

(12) United States Patent
 Samojeden

(10) Patent No.: US 11,376,984 B2
(45) Date of Patent: Jul. 5, 2022

(54) ELECTRIC VEHICLE CHARGER WITH LOAD SHEDDING

(71) Applicant: Hubbell Incorporated, Shelton, CT (US)

(72) Inventor: Matthew Samojeden, Rye, NY (US)

(73) Assignee: Hubbell Incorporated, Shelton, CT (US)

(*) Notice: Subject to any disclaimer, the term of this patent is extended or adjusted under 35 U.S.C. 154(b) by 364 days.

(21) Appl. No.: 15/981,455

(22) Filed: May 16, 2018

(65) Prior Publication Data

US 2018/0334051 A1 Nov. 22, 2018

Related U.S. Application Data

(60) Provisional application No. 62/506,816, filed on May 16, 2017.

(51) Int. Cl.
| | |
|---|---|
| *B60L 53/63* | (2019.01) |
| *H02J 3/28* | (2006.01) |
| *H02J 13/00* | (2006.01) |
| *H02J 7/04* | (2006.01) |

(52) U.S. Cl.
CPC ............... *B60L 53/63* (2019.02); *H02J 3/28* (2013.01); *H02J 7/045* (2013.01); *H02J 13/0017* (2013.01); *H02J 13/0075* (2013.01)

(58) Field of Classification Search
CPC . Y02E 60/12; H02J 7/14; H02J 7/0068; H02J 3/28; H02J 7/045; H02J 13/0017; H02J 13/0075; H01M 10/44; H01M 10/441; B60L 11/1844; B60L 53/63; Y02T 10/705; Y02T 10/7005; Y02T 10/7008;
(Continued)

(56) References Cited

U.S. PATENT DOCUMENTS

| | | |
|---|---|---|
| 9,045,042 B2 | 6/2015 | Kusumi et al. |
| 2011/0109266 A1 | 5/2011 | Rossi |
| 2012/0032636 A1 | 2/2012 | Bianco |

(Continued)

FOREIGN PATENT DOCUMENTS

| | | |
|---|---|---|
| EP | 2690746 | 1/2014 |
| WO | 2013030641 | 3/2013 |
| WO | 2013144947 | 10/2013 |

OTHER PUBLICATIONS

PCT/US2018/032975 International Search Report and Written Opinion dated Jul. 30, 2018 (11 pages).
(Continued)

*Primary Examiner* — Richard Isla
*Assistant Examiner* — Mohammed J Sharief
(74) *Attorney, Agent, or Firm* — Michael Best & Friedrich LLP

(57) ABSTRACT

Methods and apparatus for electric vehicle charger with load shedding. One embodiment provides a method of load shedding including receiving, at an electronic processor of an EV charger, an indication of an amount of current flowing through a main switchboard connected to the EV charger and determining, with the electronic processor, whether the amount of current exceeds a predetermined threshold. The method also includes reducing, using the electronic processor, a charge rating of the EV charger when the amount of current exceeds the predetermined threshold.

7 Claims, 5 Drawing Sheets

(58) Field of Classification Search
CPC ..... Y02T 90/14; Y02T 90/128; Y02T 90/163; Y02T 10/7088
USPC ........................................ 320/104, 109, 162
See application file for complete search history.

(56) References Cited

U.S. PATENT DOCUMENTS

| | | | |
|---|---|---|---|
| 2012/0306455 A1* | 12/2012 | Fischbach | H02J 7/00 320/162 |
| 2013/0046411 A1 | 2/2013 | Al Faruque et al. | |
| 2015/0043662 A1* | 2/2015 | Igarashi | H01M 10/44 375/257 |
| 2015/0214748 A1* | 7/2015 | Lin | H02J 50/80 307/104 |
| 2015/0280486 A1* | 10/2015 | Hsu | H02J 7/045 320/107 |
| 2018/0118046 A1* | 5/2018 | Jefferies | G01R 31/3842 |
| 2018/0138731 A1* | 5/2018 | Baba | G06Q 50/06 |
| 2018/0257495 A1* | 9/2018 | Miller | B60L 53/68 |
| 2018/0331552 A1* | 11/2018 | Tsuchiyama | G01R 31/382 |

OTHER PUBLICATIONS

EP 18801845 extended European Search Report and Search opinion dated Oct. 19, 2020.

* cited by examiner

ELECTRIC VEHICLE CHARGER WITH LOAD SHEDDING

RELATED APPLICATIONS

This application claims the benefit to U.S. Provisional Patent Application No. 62/506,816, filed on May 16, 2017, the entire contents of which are incorporated herein by reference.

FIELD

Embodiments relate generally to chargers for electric vehicles.

SUMMARY

Electric vehicle (EV) chargers may operate at high currents to provide fast charging to the electric vehicles. When used in conjunction with other appliances at a location (for example, in a residence, in an office building, etc.), the EV charger in conjunction with the other appliances may put a significant load on a main switchboard of the location, causing the switchboard to trip one or more circuit breakers.

One embodiment provides a method of load shedding including receiving, at an electronic processor of an EV charger, an indication of an amount of current flowing through a main switchboard connected to the EV charger and determining, with the electronic processor, whether the amount of current exceeds a predetermined threshold. The method also includes reducing, using the electronic processor, a charge rating of the EV charger when the amount of current exceeds the predetermined threshold.

Another embodiment provides a method of load shedding including receiving, at an electronic processor of an EV charger, a first indication of an amount of current flowing through a main switchboard connected to the EV charger and determining, with the electronic processor, whether the amount of current exceeds a first predetermined threshold. The method also includes determining, with the electronic processor, whether the charge rating of the EV charger is at a first rating and reducing, using the electronic processor, the charge rating of the EV charger to a second rating when the amount of current exceeds the first predetermined threshold and when the charge rating is at the first rating. The method further includes receiving, at the electronic processor, a second indication of an amount of current flowing through the main switchboard and determining, with the electronic processor, whether the amount of current is below a second predetermined threshold. The method also includes determining, with the electronic processor, whether the charge rating of the EV charger is at the second rating and increasing, using the electronic processor, the charge rating of the EV charger to the first rating when the amount of current is below the second predetermined threshold and when the charge rating is at the second rating.

Yet another embodiment provides a charger including an electronic processor connected to a charger transceiver and a load shedder. The electronic processor is configured to receive, via the charger transceiver, an indication of an amount of current flowing through a main switchboard connected to the charger and determine whether the amount of current exceeds a predetermined threshold. The electronic processor is also configured to reduce a charge rating of the charger when the amount of current exceeds the predetermined threshold.

Yet another embodiment provides a charger including an electronic processor connected to a charger transceiver and a load shedder. The electronic processor is configured to receive, via the charger transceiver, a first indication of an amount of current flowing through a main switchboard connected to the charger and determine whether the amount of current exceeds a first predetermined threshold. The electronic processor is also configured to determine whether the charge rating of the charger is at a first rating and reduce the charge rating of the charger to a second rating when the amount of current exceeds the first predetermined threshold and when the charge rating is at the first rating. The electronic processor is further configured to receive a second indication of an amount of current flowing through the main switchboard and determine whether the amount of current exceeds a second predetermined threshold. The electronic processor is also configured to determine whether the charge rating of the charger is at the second rating and increase the charge rating of the charger to the first rating the amount of current is below the second predetermined threshold and when the charge rating is at the second rating.

Other aspects of the application will become apparent by consideration of the detailed description and accompanying drawings.

DETAILED DESCRIPTION

Before any embodiments of the application are explained in detail, it is to be understood that the application is not limited in its application to the details of construction and the arrangement of components set forth in the following description or illustrated in the following drawings. The application is capable of other embodiments and of being practiced or of being carried out in various ways.

In some applications (for example, residential applications), a main switchboard may be rated to operate below 100 Amperes. Accordingly, the main switchboard may trip a fuse or a breaker when the current flowing through the main switchboard exceeds 100 Amperes to prevent damage to the electrical systems in a power distribution system. EV chargers may be rated to operate at 32 Amperes. When the EV chargers are used in conjunction with other high-rated household appliances, for example, vacuum cleaners, space heaters, and the like, the current drawn from the main switchboard may exceed 100 Amperes and as such trip a fuse or breaker of the main switchboard. In some embodiments, this may be corrected by reducing a rating of the EV charger when the current drawn from the main switchboard exceeds the maximum current. However, in these embodiments, the EV charger may not return to normal rating when the main switchboard is operating at normal conditions thereby affecting the quality of charging provided.

Figure 1:
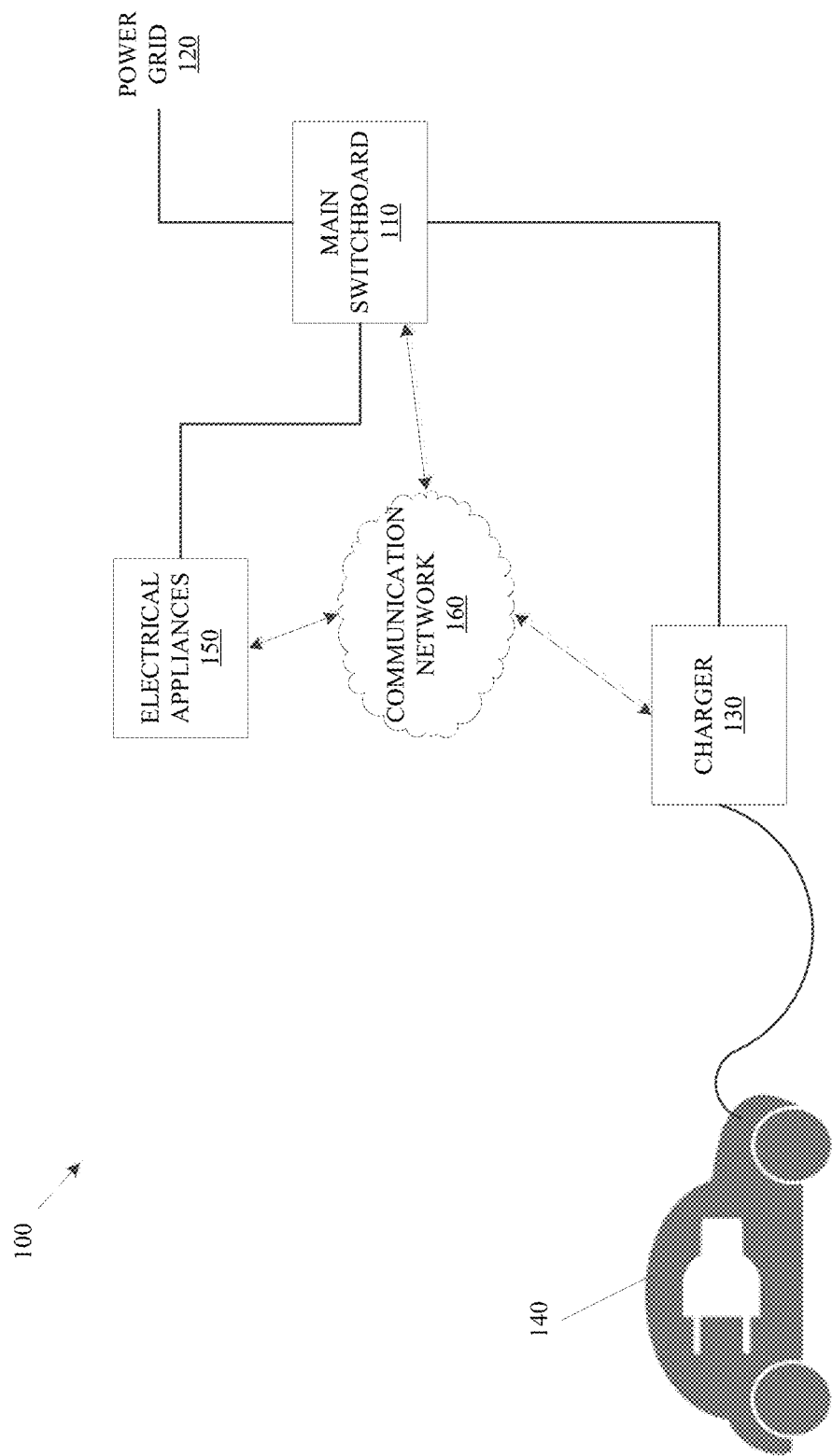
FIG. 1 is a block diagram of a power distribution system in accordance with some embodiments.

FIG. 1 is a block diagram of one embodiment of a power distribution system 100. In the example illustrated, the power distribution system 100 includes a main switchboard 110 that receives power from a power grid 120, for example, a power grid of a utility company, a home power grid, solar panels, wind turbine, or the like. An electric vehicle (EV) charger 130 used to charge an electric vehicle 140 is connected to the main switchboard 110 to receive operating power. Other electrical appliances 150, such as, household appliances, chargers, and the like may also be connected to the main switchboard 110 to receive operating power. The main switchboard 110, the EV charger 130, and the other electrical appliances 150 may communicate over a communication network 160. The communication network 160 may be a wireless communication network such a wide area network (WAN) (e.g., the Internet, a TCP/IP based network, a cellular network, such as, for example, a Global System for Mobile Communications [GSM] network, a General Packet Radio Service [GPRS] network, a Code Division Multiple Access [CDMA] network, an Evolution-Data Optimized [EV-DO] network, an Enhanced Data Rates for GSM Evolution [EDGE] network, a 3GSM network, a 4GSM network, a Digital Enhanced Cordless Telecommunications [DECT] network, a Digital AMPS [IS-136/TDMA] network, or an Integrated Digital Enhanced Network [iDEN] network, etc.). In other embodiments, the network is, for example, a local area network (LAN), a neighborhood area network (NAN), a home area network (HAN), or personal area network (PAN) employing any of a variety of communications protocols, such as Wi-Fi, Bluetooth, ZigBee, etc. In yet another embodiment, the network 160 includes one or more of a wide area network (WAN), a local area network (LAN), a neighborhood area network (NAN), a home area network (HAN), or personal area network (PAN).

Figure 2:
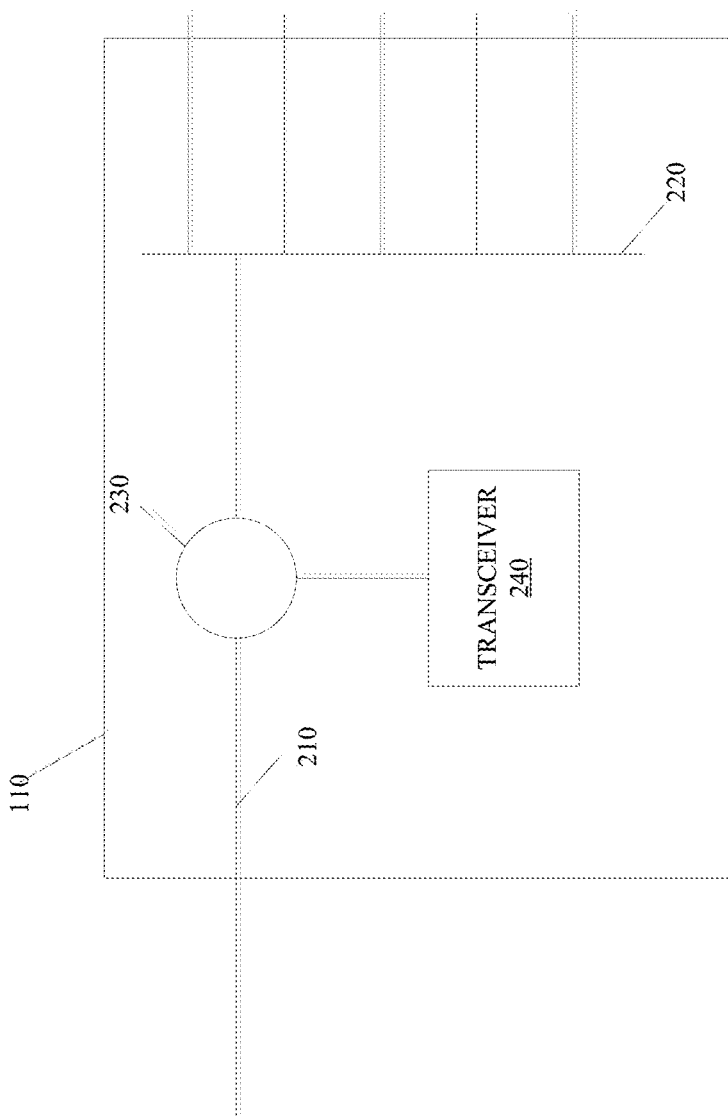
FIG. 2 is a block diagram of a main switchboard of the power distribution system of FIG. 1 in accordance with some embodiments.

FIG. 2 is a block diagram of one embodiment of the main switchboard 110. The main switchboard 110 includes a main power line 210, a switchboard 220, a current sensor 230, and a transceiver 240. The main power line 210 is connected to the power grid 120 to receive electrical power that is then distributed by the power distribution system 100. The switchboard 220 provides the electrical power from the power grid 120 to the electrical appliances in the house. The current sensor 230 detects a current flowing through the main switchboard 110. In some embodiments, a circuit breaker (not shown) may also be connected to the current sensor 230 to cut off a current supply to the household appliances in case of excess current flowing through the main switchboard 110.

The transceiver 240 enables wireless communication from the main switchboard 110 to, for example, the EV charger 130, other electrical appliances 150, and the like over the communication network 160. In other embodiments, rather than the transceiver 240, the main switchboard 110 may include separate transmitting and receiving components, for example, a transmitter, and a receiver. In yet other embodiments, the main switchboard 110 may only include a transmitter. The transceiver 240 may be connected to the current sensor 230 or to a switchboard electronic processor (not shown) (for example, an electronic processor of a remote computer) connected to the current sensor 230. The transceiver 240 is configured to transmit an indication of the amount of current flowing through the main switchboard 110.

Figure 3:
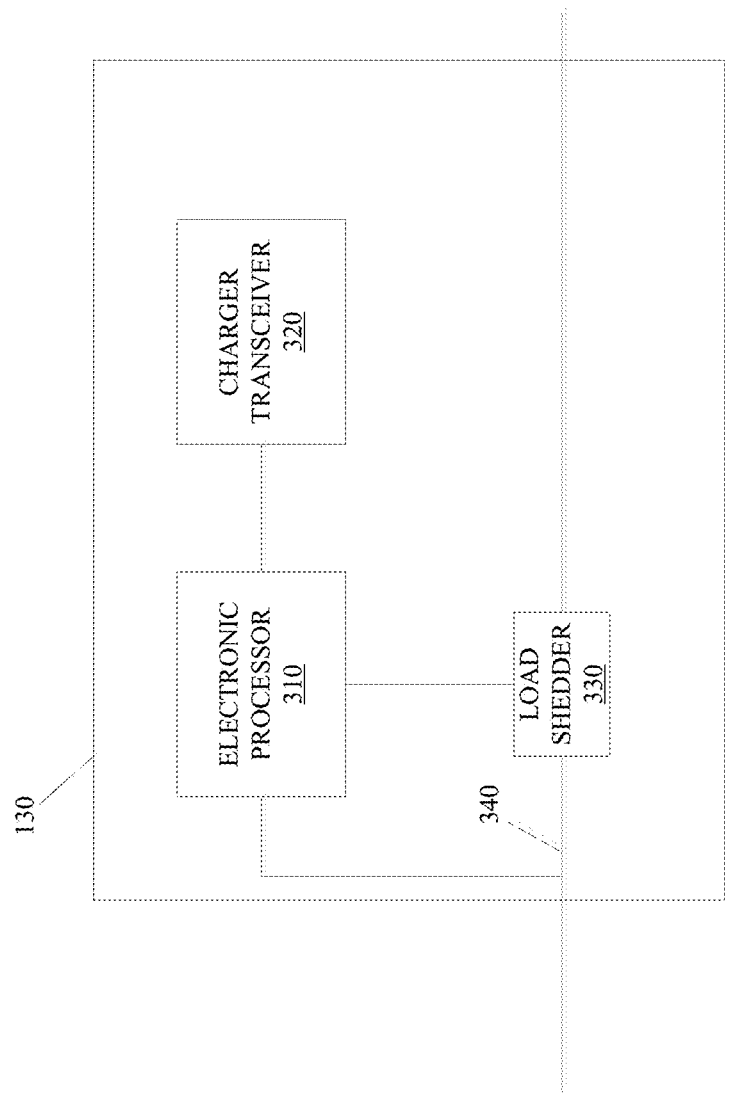
FIG. 3 is a block diagram of an electric vehicle charger in accordance with some embodiments.

FIG. 3 is a block diagram of one embodiment of the EV charger 130. In the example illustrated, the EV charger 130 includes an electronic processor 310, a charger transceiver 320, and a load shedder 330.

In some embodiments, the electronic processor 310 is implemented as a microprocessor with separate memory. In other embodiments, the electronic processor 310 may be implemented as a microcontroller (with memory on the same chip). In other embodiments, the electronic processor 310 may be implemented using multiple processors. In addition, the electronic processor 310 may be implemented partially or entirely as, for example, a field-programmable gate array (FPGA), and application specific integrated circuit (ASIC), and the like and the memory may not be needed or be modified accordingly.

The charger transceiver 320 enables wireless communication for the EV charger 130, for example, with the main switchboard 110, other electrical appliances 150, or the like, over the communication network 160. In other embodiments, rather than a charger transceiver 320, the EV charger 130 may include separate transmitting and receiving components, for example, a transmitter, and a receiver.

The load shedder 330 is connected on a power line 340 receiving operating power from the main switchboard 110. The load shedder 330 may be a charging circuit, or part of a charging circuit of the EV charger 130. The load shedder 330 may receive control signals from the electronic processor 310. The load shedder 330 may be configured to reduce the amount of current provided to the electric vehicle 140, and thereby reduce the amount of current drawn from the main switchboard 110. In some embodiments, the load shedder 330 is implemented as a current limiting circuit. For example, the load shedder 330 may be implemented as a variable resistor, a triac, or the like. In another example, the load shedder 330 may be implemented as a PWM controlled field effect transistor (FET) circuit or the like.

Figure 4:
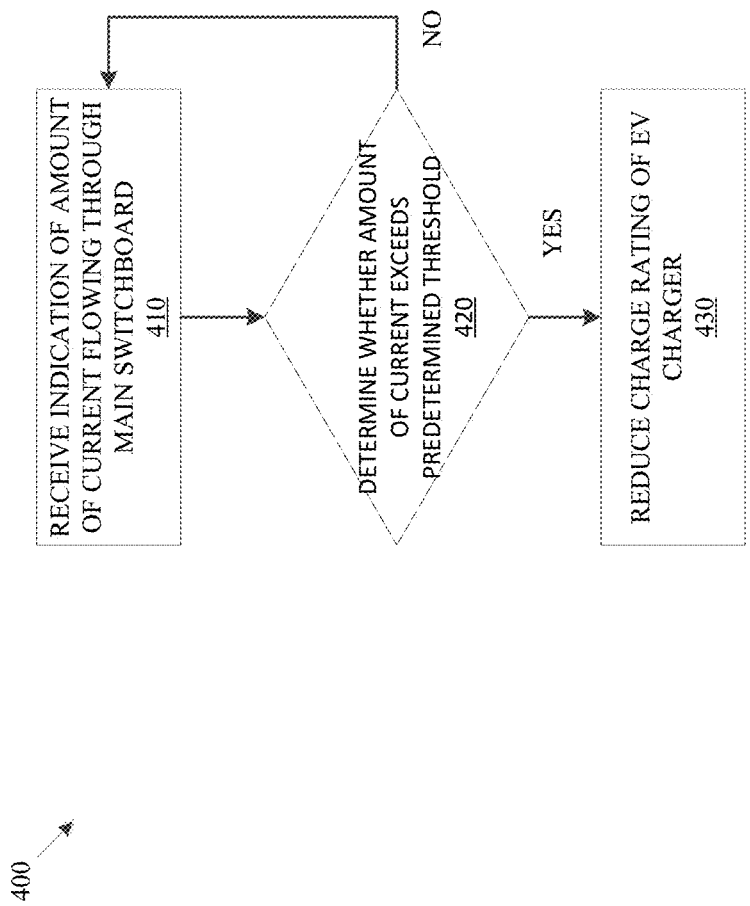
FIG. 4 is a flowchart illustrating a method of load shedding in accordance with some embodiments.

FIG. 4 is a flowchart illustrating one example method 400 of load shedding. It should be understood that the order of the steps disclosed in method 400 could vary. Additional steps may also be added to the control sequence and not all of the steps may be required. As illustrated in FIG. 4, the method 400 includes receiving, at the electronic processor 310, an indication of an amount of current flowing through the main switchboard 110 (at block 410). The main switchboard 110 includes the current sensor 230, which measures a current flowing through the main switchboard 110. The main switchboard 110 may send an indication of the amount of current flowing through the main switchboard 110 via the transceiver 240 over the communication network 160. The electronic processor 310 receives the indication over the communication network 160 via the charger transceiver 320. The main switchboard 110 may send the indication periodically, for example, after every 1 millisecond, every 1 second, every 5 seconds, etc.

The method 400 also includes determining, with the electronic processor 310, whether the amount of current exceeds a predetermined threshold (block 420). The predetermined threshold may be a percentage of the maximum amount of current that can flow through the main switchboard 110 without tripping a fuse or breaker. For example, the predetermined threshold may be 90% of the maximum current. In some embodiments, a default threshold may be programmed into the EV charger 130, which may be changed by a user. When the electronic processor 310 determines that the amount of current does not exceed the predetermined threshold, method 400 cycles back to block 410.

When the electronic processor 310 determines that the amount of current exceeds the predetermined threshold, a charge rating of the EV charger 130 is reduced (at block 430). Reducing the charge rating may include reducing an amount of current drawn by the EV charger 130 from the main switchboard 110. The electronic processor 310 may provide control signals to the load shedder 330 instructing the load shedder 330 to reduce the charge rating of the EV charger 130.

Figure 5:
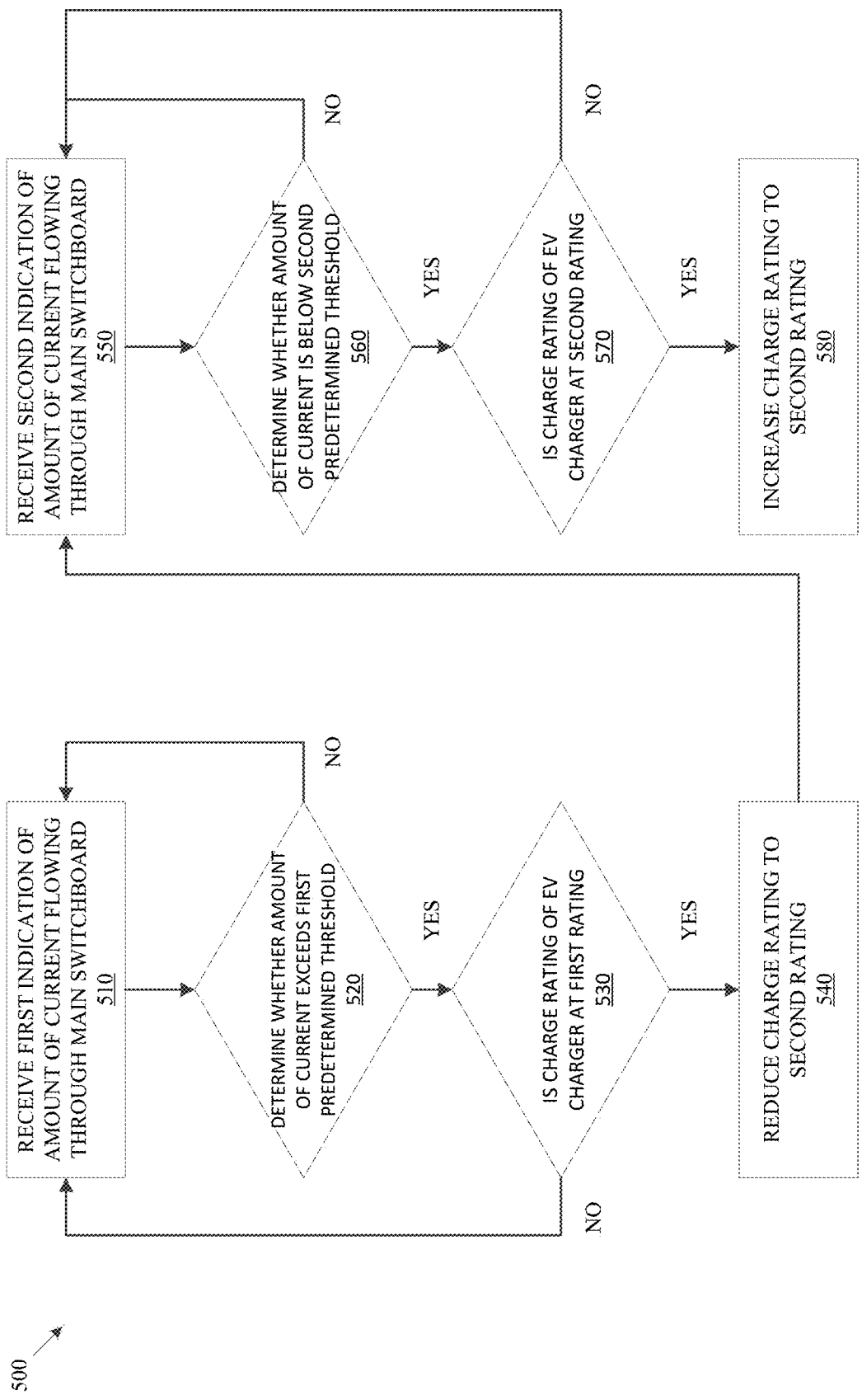
FIG. 5 is a flowchart illustrating a method of load shedding in accordance with some embodiments.

FIG. 5 is a flowchart illustrating another example method 500 of load shedding. It should be understood that the order of the steps disclosed in method 500 could vary. Additional steps may also be added to the control sequence and not all of the steps may be required. As illustrated in FIG. 5, the method 500 includes receiving, at the electronic processor 310, a first indication of an amount of current flowing through the main switchboard 110 (at block 510). As described above, the electronic processor 310 may receive the indication from the main switchboard 110 over the communication network 160.

The method 500 further includes determining, with the electronic processor 310, whether the amount of current exceeds a first predetermined threshold (at block 520). As described above, the first predetermined threshold may be a percentage of the maximum amount of current allowed to flow through the main switchboard 110. When the electronic processor 310 determines that the amount of current does not exceed the first predetermined threshold, method 500 cycles back to block 510. When the electronic processor 310 determines that the amount of current exceeds the first predetermined threshold, the method 500 includes determining, with the electronic processor 310, whether a charge rating of the EV charger 130 is at a first rating (at block 530). For example, the electronic processor 310 may determine that the EV charger 130 is operating at a maximum rating and drawing a current at the maximum rated amount of the EV charger 130. When the electronic processor 310 determines that the charge rating of the EV charger 130 is not at the first rating, the method 500 cycles back to block 510.

When the electronic processor 310 determines that the amount of current exceeds the first predetermined threshold and that the charge rating of the EV charger 130 is at the first rating, the method 500 includes reducing the charge rating to a second rating (at block 540). The second rating may be a lower rating than the first rating. For example, the second rating may include the EV charger 130 drawing a minimum amount of charging current from the main switchboard 110. For example, the second rating may include operating the EV charger 130 at, for example, approximately 15% of the maximum rated current to approximately 25% of the maximum rated current. In some embodiments, the electronic processor 310 may turn off charging when the amount of current exceeds the predetermined threshold.

The method 500 includes receiving, at the electronic processor 310, a second indication of an amount of current flowing through the main switchboard 110 (at block 550). The second indication may be received a certain amount of time after the first indication. The method 500 includes determining, with the electronic processor 310, whether the amount of current is below a second predetermined threshold (at block 560). The second predetermined threshold may be lower than the first predetermined threshold. For example, the second predetermined threshold may be set at, for example, approximately 35% of the maximum amount of current to approximately 45% of the maximum amount of current allowed to flow through the main switchboard 110. When the electronic processor 310 determines that the amount of current does not exceed the second predetermined threshold, method 500 cycles back to block 550.

When the electronic processor 310 determines that the amount of current does not exceed the second predetermined threshold, the method 500 also includes determining, with the electronic processor 310, whether the charge rating of the EV charger 130 is at the second rating (at block 570). When the electronic processor 310 determines that the charge rating of the EV charger 130 is not at the second rating, the method 500 cycles back to block 550. When the electronic processor 310 determines that the amount of current exceeds the second predetermined threshold and that the charge rating of the EV charger 130 is at the second rating the method 500 includes increasing the charge rating to the first rating (at block 580). For example, the electronic processor 310 may determine based on the second indication that returning the EV charger 130 to the maximum rating will cause the amount of current flowing through the main switchboard 110 to exceed the maximum allowed current. The electronic processor 310 may therefore increase the charge rating of the EV charger 130 to allow fast charging of the electric vehicle 140.

In some embodiments, rather than switching between two charge ratings (i.e., the first rating and the second rating), the electronic processor 310 may switch the EV charger 130 between multiple charge rating based on the amount of current flowing through the main switchboard 110.

One of ordinary skill in the art would appreciate that the functionality described in methods 400 and 500 may be performed by the electronic processor 310 or may be shared between the electronic processor 310 and an electronic processor of the main switchboard. In addition, although the methods 400 and 500 are described as being performed by an EV charger 130, the functionality may be performed by any charger or electrical appliance connected to the main switchboard 110. In yet other embodiments, the functionality described in methods 400 and 500 may be performed by remote computer (for example, a laptop computer, a smart telephone, or the like) that is connected to the communication network 150 to control the EV charger 130.

Thus, the application provides, among other things, an electric vehicle charger with load shedding.

What is claimed is:

1. A method of load shedding, the method comprising:
   receiving, at an electronic processor of an electric vehicle charger, a first indication of an amount of current flowing through a main switchboard connected to the electric vehicle charger;
   determining, with the electronic processor, whether the amount of current exceeds a first predetermined threshold, wherein the first predetermined threshold is a percentage of a maximum amount of current allowed to flow through the main switchboard;
   determining, with the electronic processor, whether a charge rating of the electric vehicle charger is at a first charge rating;
   reducing, using the electronic processor, the charge rating of the electric vehicle charger to a second charge rating when the amount of current exceeds the first predetermined threshold and when the charge rating is at the first rating;
   receiving, at the electronic processor, a second indication of an amount of current flowing through the main switchboard;
   determining, with the electronic processor, whether the amount of current is below a second predetermined threshold;
   determining, with the electronic processor, whether the charge rating of the electric vehicle charger is at the second rating; and increasing, using the electronic processor, the charge rating of the electric vehicle charger to the first rating when the amount of current is below the second predetermined threshold and the charge rating is at the second rating;

wherein the first indication and the second indication are received over a wireless communication network.

2. The method of claim 1, wherein the electronic processor is at least one selected from the group consisting of an electronic processor of the electric vehicle charger and an electronic processor of a remote computer.

3. The method of claim 1, wherein reducing the charge rating comprises reducing a charging current of the electric vehicle charger.

4. The method of claim 1, wherein increasing the charge rating comprises increasing a charging current of the electric vehicle charger.

5. A charger comprising:
a charger transceiver;
a load shedder; and
an electronic processor coupled to the charger transceiver and the load shedder, the electronic processor configured to:
receive, via the charger transceiver, a first indication of an amount of current flowing through a main switchboard connected to the charger,
determine whether the amount of current exceeds a first predetermined threshold, wherein the first predetermined threshold is a percentage of a maximum amount of current allowed to flow through the main switchboard,
determine whether a charge rating of the charger is at a first charge rating,
reduce the charge rating of the charger to a second charge rating when the amount of current exceeds the first predetermined threshold and when the charge rating is at the first rating,
receive a second indication of an amount of current flowing through the main switchboard,
determine whether the amount of current is below a second predetermined threshold,
determine whether the charge rating of the charger is at the second rating, and
increase the charge rating of the charger to the first rating when the amount of current is below the second predetermined threshold and the charge rating is at the second rating;

wherein the first indication and the second indication are received over a wireless communication network.

6. The charger of claim 5, wherein reducing the charge rating comprises reducing a charging current of the charger.

7. The charger of claim 5, wherein increasing the charge rating comprises increasing a charging current of the charger.

* * * * *